Dec. 20, 1966 E. H. PORTER 3,293,087
METHOD OF MAKING ISOLATED EPITAXIAL FIELD-EFFECT DEVICE
Filed March 5, 1963 3 Sheets-Sheet 1
FIG. IA
FIG. IB
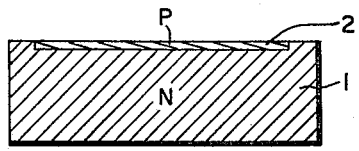
FIG. IC
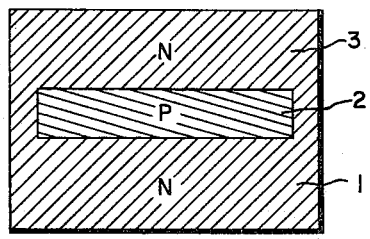
FIG. ID
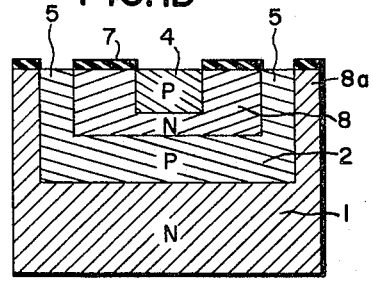
FIG. IE
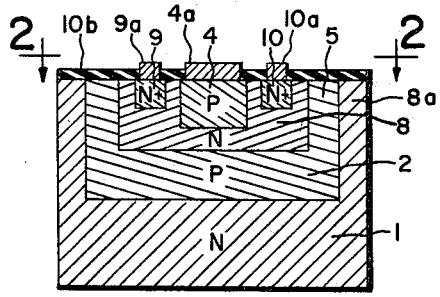
FIG. 2
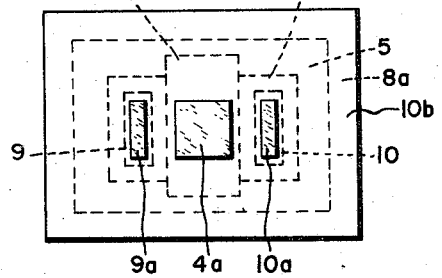
FIG. 3
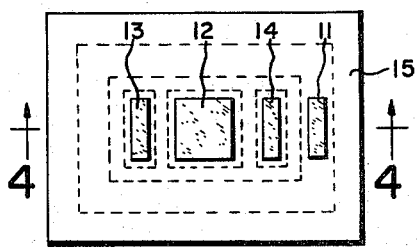
FIG. 4
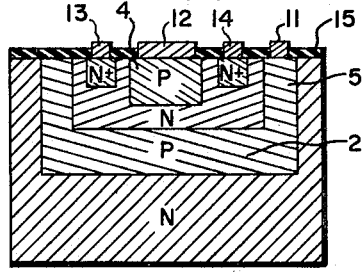
INVENTOR.
EDWIN H. PORTER
BY
*Lippincott, Ralls & Henderson*
ATTORNEYS INVENTOR.
EDWIN H. PORTER
BY
Lippincott, Ralls & Henderson
ATTORNEYS Dec. 20, 1966   E. H. PORTER   3,293,087
METHOD OF MAKING ISOLATED EPITAXIAL FIELD-EFFECT DEVICE
Filed March 5, 1963   3 Sheets-Sheet 3
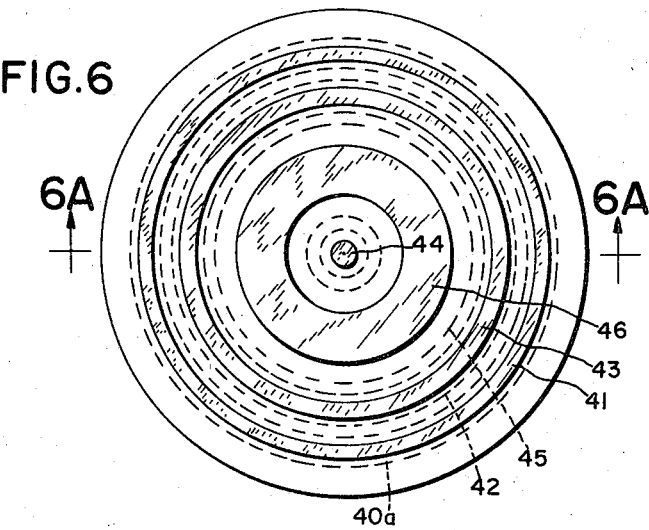
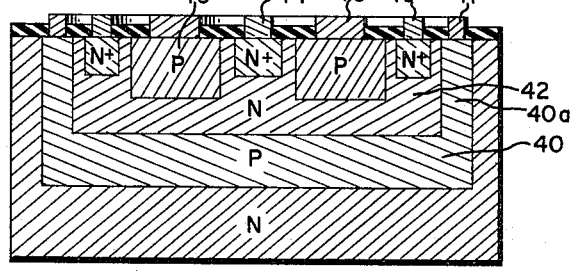
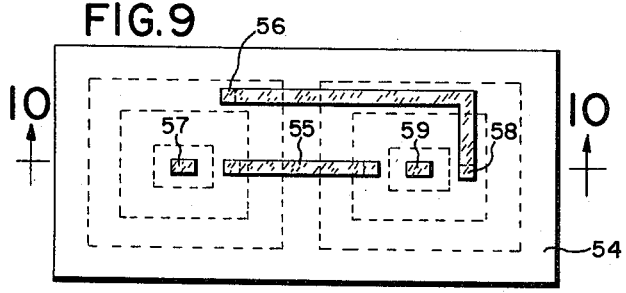
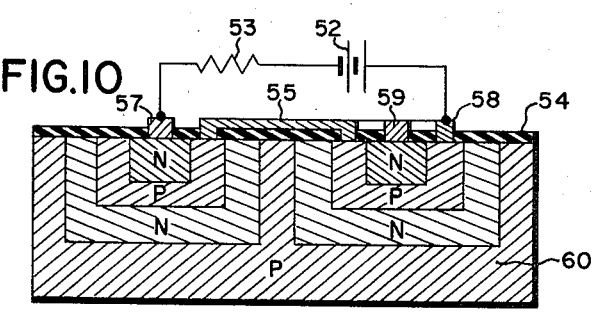
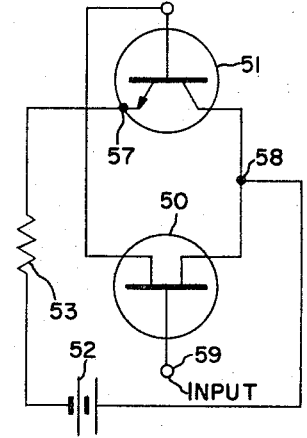
INVENTOR.
EDWIN H. PORTER
BY
*Lippincott, Ralls & Hendricson*
ATTORNEYS //
3,293,087
METHOD OF MAKING ISOLATED EPITAXIAL
FIELD-EFFECT DEVICE
Edwin H. Porter, Mountain View, Calif., assignor to Fairchild Camera and Instrument Corporation, Syosset, Long Island, N.Y., a corporation of Delaware
Filed Mar. 5, 1963, Ser. No. 262,999
4 Claims. (Cl. 148—175)

This invention relates to a new isolated epitaxial field-effect device, and to a method of making the device. The devices and method of the invention are most useful when more than one semiconductor device including at least one field-effect device, are to be placed on a single body of semiconductor material and each such device is to be isolated from the others.

A field-effect transistor operates on very different principles from ordinary transistors. It has a narrow region of semiconductor, called the channel, containing two spaced-apart electrodes, one called the drain, and the other called the source. Another region of semiconductor material called the gate is located adjacent to a portion of the channel between source and drain. The gate is of the opposite conductivity type from the channel, forming a P-N junction with it. A third electrode is connected to the gate.

When a voltage is applied between drain and source, current flows through the channel. The amount of such current flow is controlled by the gate potential. The P-N junction between the gate and the channel is reverse biased, so that there is no appreciable current flow across the junction, making the input impedance to the gate electrode high. A depletion region forms about the P-N junction, causing a shortage of majority current carriers in the semiconductor adjacent to the junction. The width of the depletion region varies with the gate potential and therefore with the reverse bias voltage on the gate electrode. The resultant shortage of majority carriers in the channel inhibits channel current flow. In certain field-effect devices, a sufficient reverse bias voltage on the gate electrode causes the depletion region to become wide enough so that it extends the entire width of the channel, and source-to-drain current is virtually cut off. This condition is called pinch-off, and the gate electrode voltage necessary to achieve it is called pinch-off voltage.

An epitaxial field-effect device has its channel region, at least, formed epitaxially by epitaxial growth processes known in the art. Epitaxial field-effect devices are not new. A reference to one of them appears in "Silicon Field-Effect Transistor With Internal Epitaxial Channel," Proceedings of the IRE, August, 1962, p. 1824. The device shown there, however, cannot easily be isolated. In other words, when more than one of the devices described in the above article are placed on the same wafer of semiconductor material, or placed on a wafer with other semiconductor devices, there is no easy way to isolate the lower gate of each separate device (formed in part within the common substrate) from the lower gates of all the other devices on the same wafer. Consequently, all such field-effect devices on the same wafer should have at least one set of gates in common. On the other hand, it is sometimes desirable that each device have two individual gates to provide two separate points at which the channel current of each device may be regulated.

This invention provides an improved epitaxial field-effect device wherein both the lower and upper gate regions are formed by diffusion, and may be isolated from each other and/or from all other devices on a single wafer. The field-effect device of this invention has a gradient of conductivity-determining impurities in both gate regions which increases in concentration in the direction away from the channel. Therefore, the devices of the invention have a relatively low junction capacitance, a low pinch-off voltage, and a high breakdown voltage. Furthermore, both gate regions are formed by diffusion; this feature permits the channel thickness to be regulated through diffusion control techniques well established in the art. Both gates of each field-effect device, whether they are kept electrically separate from each other or are connected together, may be isolated from the gate or gates of all other devices located on the same wafer. Such construction was not possible with the prior art devices.

Briefly, the device of this invention is an isolated epitaxial field-effect device formed in a single, unitary body of a semiconductor material. The device has a channel region of one conductivity type and two gate regions of the opposite conductivity type, which may be separate or connected. The channel region and part of the lower gate region are formed epitaxially. One of these gate regions is adjacent to the upper surface of the channel region and the other to the lower surface. Each forms a P-N junction with the channel. All regions of the device extend to the surface of the body of semiconductor material. The channel has two electrodes at the surface of the device in contact with it, one on either side of the upper gate; these are used to pass channel current through the channel. If the gates are not connected together, one electrode is located on each—preferably at the surface of the device—to apply the gate voltage. If the gates are connected together, only one such gate electrode is necessary.

For isolation of separate field-effect devices on a single wafer of semiconductor material, an extension of the lower gate region is diffused through the epitaxial layer so that it extends to the surface of the device. The electrode which is to be in contact with the lower gate (where the two gates are not connected) can be located on the surface of the device in contact with this extension of the lower gate region at the surface. Where the upper and lower gates are connected, the upper gate region extends laterally on the surface of the wafer beyond the channel. The lateral extension is then in contact with the upper extension of the lower gate region. A second portion of the epitaxial layer, not part of the channel region, surrounds the lower gate region (which is of opposite conductivity type from the channel) to isolate each device from the next. This surrounding region is termed the isolation region. It is bounded at the top by the surface of the device, and at the bottom by the substrate of matching conductivity type. As is well known in the art, the junction between the isolation region and the lower gate region may be reverse-biased, for better isolation.

The method of making the epitaxial field-effect devices begins by predeposition of a region of impurities of one conductivity type to form the lower gate region on a wafer or substrate of the opposite conductivity type. An epitaxial layer of the same conductivity type as the substrate is grown over this predeposited layer. During epitaxial growth, the predeposited layer diffuses part way into the newly forming epitaxial layer. The upper gate region is then diffused into the epitaxial layer from the upper surface of the wafer. The depth of diffusion is controlled by methods well known in the art, so that a channel is left between the lower surface of the upper gate and the upper surface of the lower gate. In order to make contact with the lower gate at the surface of the device, an extension of the lower gate region of the same conductivity type as the gates, is diffused in from the surface of the wafer, to a depth sufficient to place it in contact with the main portion of the lower gate.

Alternatively, fast-diffusing impurities may be predeposited along with the impurities for the lower gate to diffuse out from the substrate to form this extension. For isolation, a portion of the epitaxial layer is left surrounding the extensions of the lower gate, providing a junction between the two regions which may be reverse-biased.

If desired, small low resistivity regions of the same conductivity type as the channel may be diffused into the channel at the surface of the wafer where electrodes are to be placed. These provide a better ohmic contact between the electrodes and the channel.

The invention may be better understood from the following more detailed description and the drawings, in which:

FIGS. 1A–E are a series of greatly enlarged, somewhat schematic transverse sectional views showing a device of this invention at successive stages of manufacture by the method of the invention;

FIG. 2 is a greatly enlarged, somewhat schematic plan view of the embodiment of the invention shown in transverse section in FIG. 1E;

FIG. 3 is a greatly enlarged, somewhat schematic plan view of a device of another embodiment of the invention;

FIG. 4 is a transverse section taken through plane 4—4 of FIG. 3;

FIGS. 5A–D are a series of greatly enlarged, somewhat schematic, transverse sectional views showing a device of another embodiment of the invention at successive stages of manufacture;

FIG. 6 is a greatly enlarged, somewhat schematic plan view of one embodiment of the invention using circular channel and gate regions;

FIG. 6A is a transverse section taken along line 6A—6A of FIG. 6.

Figure 7A:
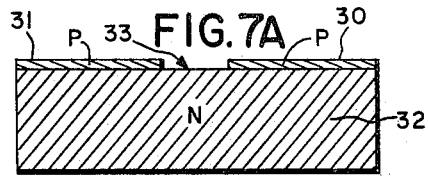
Figure 7B:
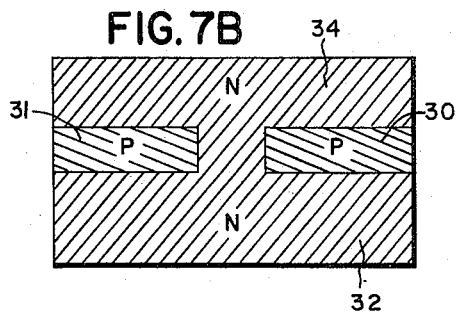
Figure 7C:
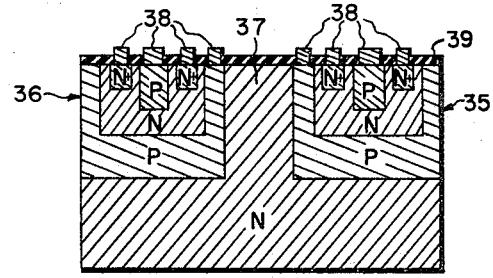
Figure 8:
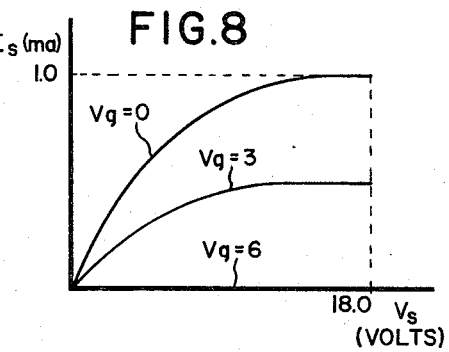

FIGS. 7A–C are a series of greatly enlarged, somewhat schematic transverse sectional views showing a plurality of epitaxial field-effect devices on one wafer at successive stages of manufacture, the completed device being shown in FIG. 7C; and FIG. 8 is a graph showing the characteristics of a representative device of one embodiment of the invention;

FIG. 9 is a somewhat schematic, greatly enlarged plan view of an integrated circuit using an isolated field-effect device of the invention with a transistor;

FIG. 10 is a transverse section taken along line 10—10 of FIG. 9, showing schematically the attached circuit elements; and FIG. 11 is a schematic circuit diagram of a simple circuit using the integrated circuit of FIGS. 9 and 10.

Referring to FIG. 1, the devices of the invention are made from a wafer or substrate semiconductor material 1, such as silicon. Although a wafer uniformly doped with N-type conductivity-determining impurities is shown, P-type could be used as well. With a P-type wafer, the conductivity type of the remaining regions is reversed from that shown. A layer of impurities 2, shown in FIG. 1B, is then predeposited over the surface of wafer 1. It is noted that this layer is smaller than the surface of the substrate 1. The periphery around layer 2 will form the isolation region, as explained later. Preferably, wafer 1 is subjected to a gaseous diffusion atmosphere containing the desired impurities to form the predeposition layer 2. These impurities diffuse into the surface of substrate 2. The diffusion time and depth depend upon the resistivity and depth of the layer desired. The use of this method of forming the layer 2, however, is not essential to the invention. Alternatively, the layer may be deposited on the substrate in any manner, as by painting or spraying a slurry or mixture containing the impurity element or its oxides. In the example illustrated, the impurities were P-type, such as gallium, aluminum, boron, or indium. If an N-type layer were desired, N-type impurities, such as antimony, arsenic, or phosphorus would be used. The choice of a specific impurity is sometimes made on the basis of its diffusion rate into the epitaxial layer, now to be deposited.

Referring to FIG. 1C, an epitaxial layer 3 is formed over wafer 1 and deposited layer 2. Various methods of forming this epitaxial layer are known in the art, and reference is made to Hunter, L. P., Handbook of Semiconductor Electronics, 2d ed., subchapter 7.11 (York, Pennsylvania, 1962). During epitaxial growth, predeposited layer 2 diffuses slightly into the epitaxial layer. The amount of this concurrent diffusion is governed by the time and temperature chosen for epitaxial growth, and by the diffusion rate of the impurities used to form layer 2. Layer 2 serves as the lower gate region beneath the channel, which is to be formed in epitaxial layer 3.

The formation of layer 3 is followed by two diffusion steps. As shown in FIG. 1D, and additional gate region 4 and an extension 5 of lower gate region 2 are diffused into the epitaxial layer 3 from the surface of the wafer. With a silicon semiconductor, a mask 7, preferably an oxide of silicon, is formed on layer 3. This can be done by thermal oxidation of the wafer which is well known in the art. Portions of this mask are etched away, also by processes known in the art, over the areas of the surface where diffusion is desired, leaving the pattern of oxide 7 shown in FIG. 1D. Silicon dioxide (or, under some conditions, sub-oxides of silicon) is a good mask against diffusion of certain P- and N-type dopants such as phosphorus and boron, for example. These impurities are contained in a vapor over the surface of the device and are diffused into the unmasked portions of the surface to form upper gate region 4 and extension 5 of lower gate region 2. Since the extension 5 is deeper than upper gate region 4, a deeper diffusion is used for the extension than for the gate. To do this, generally region 4 is masked during a portion of the deeper diffusion to form extension 5. Extension 5 must diffuse deeply enough to contact lower gate region 2. Extension 5 completely surrounds the portion 8 of epitaxial layer 3 which forms the channel of the device. An oxide layer forms over the entire surface during the diffusions. This oxide is left to protect the junction except where contacts to the surface are to be made.

A portion 8a of epitaxial layer 3 surrounds lower gate region 2 and its extension 5. This portion 8a is termed the isolation region. Isolation region 8a is of the opposite conductivity type from lower gate region 2 and extension 5 thereof, thus providing a PN junction between them. This junction may be reverse-biased for more effective isolation.

It has been found to be particularly advantageous, before attaching the source and drain electrodes, to diffuse in an extra-heavy concentration of channel-type impurities in small regions 9 and 10 shown in FIG. 1E directly beneath the location of these electrodes. Better contact can be made to a low-resistivity region, as a high-resistivity region often causes a rectifying contact at the electrode. Furthermore, if the electrodes are aluminum, application of the electrodes causes the P-type aluminum to compensate the N-type channel region. If the areas directly beneath the aluminum electrodes are first concentrated with N-type impurities, the channel conductivity after applying the electrodes will still be N-type. An N+region (regions 9 and 10) is a region having a doping level from about $10^{19}$ atoms per cc. to the solubility limit of the impurity used. In practice, the maximum concentration is about $2 \times 10^{21}$ atoms per cc., using arsenic, for example. An N or a P region, on the other hand, has a lower concentration of conductivity-determining impurities, i.e., from about $10^{15}$ to about $10^{19}$ atoms per cc.

Last, metal contacts 4a (to the gate), and 9a and 10a (to the channel) are deposited through holes etched in oxide layer 10b by methods well known in the art. Generally, aluminum is used for these contacts, although other metals, such as gold, are acceptable.

In the completed device shown in transverse section in FIG. 1E and in plan view in FIG. 2, the upper gate region 4 extends laterally beyond the periphery of channel region 8, making contact with the extension 5 of lower gate region 2. Since extension 5 is in contact with both the lower gate and the upper gate region 4, the device of this embodiment has only a single gate region. No separate connection is required to the lower gate region 2 or to the extension 5.

Where two separate gates are desired, as in the case where control of channel current is desired from two separate electrodes, upper gate 4 is not in contact with the extensions 5 of the lower gate region. This embodiment is shown in FIGS. 3 and 4, and again in FIGS. 6 and 6A. With two separate gates, it is possible to pinch off channel current with the proper voltage applied to either gate. In the device shown in FIGS. 3 and 4, voltage is applied to lower gate region 2 through electrode 11 contacting extension 5 of the lower gate region; voltage is applied to upper gate region 4 through electrode 12 on the upper surface of the device. Channel current is passed between electrodes 13 and 14. The surface of the device and the junctions which extend to the surface are protected during and after manufacture by oxide layer 15.

In the device shown in FIGS. 6 and 6A, lower gate region 40 has extension region 40a extending to the surface of the device, as shown in FIG. 6A. Electrode 41 is used for applying a voltage to the lower gate region 40 through extension 40a. N-type channel region 42 has two electrodes 43 and 44 for passing channel current. The gate voltage is applied to upper gate region 45 through electrode 46. Channel 42 may be pinched off by a sufficient voltage applied to the electrodes of either the upper or lower gate regions. Therefore, where dual pinchoff is required (i.e., the ability of the device to be pinched off by two separate signals), one such signal may be applied to electrode 41 and the other to electrode 46. Both of these electrodes are on the top surface of the device for convenience in attaching leads.

The circular geometry has the advantage of preventing any leakage channel current between source and drain electrodes from flowing around the ends of the upper gate region. Referring backs to FIGS. 3 and 4 for a moment, it will be observed that a small amount of channel current may pass from channel electrode 13 to channel electrode 14 without passing beneath the upper gate region 4. This is the result of current flowing around the ends of the P-type upper gate region 4, and thus avoiding the field effect of the upper gate potential. With the circular geometry of FIGS. 6 and 6A, it is not longer possible for such current to flow through the channel region 42 from electrode 43 to electrode 44 without passing beneath the upper gate region 45. Complete pinchoff from the upper gate is therefore easily achieved.

Figure 5A:
Figure 5B:
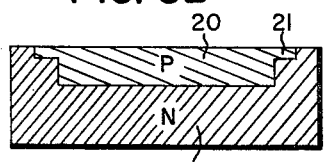

An alternative method of making the device of the invention is illustrated in FIGS. 5A–E. The layer of impurities shown in FIG. 5B is deposited on the substrate and has two portions; inside portion 20 and outside portion 21. If this layer is to be formed by diffusion, the same amount of impurities is diffused deeper into inner portion 20 than is diffused into outer portion 21. This selective diffusion places a higher concentration of impurities near the surface of outer portion 21 than near the surface of inner portion 20. During subsequent diffusion of the two portions from the substrate 1 into the epitaxial layer, this outer portion (with the higher surface impurity concentration) will diffuse into the overlying epitaxial layer farther and faster than the inner portion 20.

Alternatively, faster diffusing impurities may be used for the outer portion than for the inner portion, to effect the same result. One type of impurity may be diffused into one portion of substrate 1 separately from the other type, each portion being masked during diffusion into the other. If desired, the impurities in outer portion 21 may be both more heavily concentrated at the surface and faster diffusing. For example, boron and aluminum could be used as a pair of P-type impuries (aluminum being the faster) and phosphorus and arsenic for an N-type pair (phosphorus being the faster).

Figure 5C:
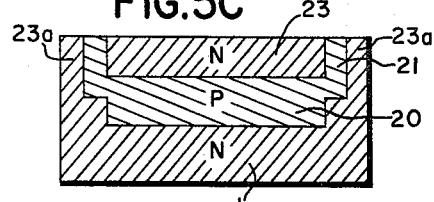
Figure 5D:
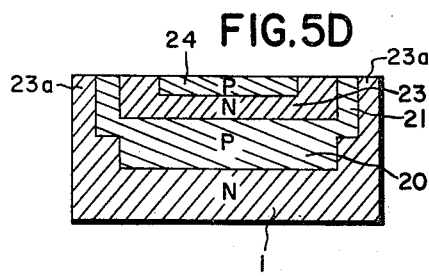

An epitaxial layer 23 is grown then over the surface of wafer 1 and the predeposited layers 20 and 21. As shown in FIG. 5C, portion 21 diffuses completely through the epitaxial layer 23 during its growth. If growth time is insufficient for this diffusion, the substrate may be heated after epitaxial growth to complete the diffusion. The slower diffusing portion 20 diffuses only part way into epitaxial layer 23 as shown. The outer region 21 serves as the extension of lower gate region 20. The inner portion 23 of the epitaxial layer serves as the channel region. The outer portion 23a serves as the isolating region, as in previous embodiments. Upper gate 24 is then diffused into channel 23 as shown in FIG. 5D. Electrical contacts to channel and gate regions (not shown) are deposited in the same manner as before. The resulting structure is equivalent to the structure shown in the earlier figures. Again, the two gates can be separate or connected, as desired.

The process of this invention is particularly advantageous for construction of isolated field-effect devices where more than one semiconductor device is placed on a single wafer of semiconductor material. The process of making a structure having two field-effect devices is illustrated in FIG. 7A–C. Two P-type layers 30 and 31 are predeposited on a single wafer of semiconductor material; e.g., silicon, in the same manner as discussed above. If vapor diffusion is used, the area 33 between these layers is suitably masked to prevent diffusion of the P-type impurities into it. Epitaxial layer 34 is then grown over the wafer 32 and layers 30 and 31, the same as before, leaving a configuration as shown in FIG. 7B. Regions 30 and 31 each serve as the lower gate for a separate field-effect device. The remaining necessary regions are formed for the separate devices in exactly the same way that was done with a single device, ending up with two devices 35 and 36 on the same wafer isolated from each other by a portion 37 of epitaxial layer 34. Metal electrodes 38 in contact with each of the regions of each device are deposited through etched openings in oxide layer 39. Where interconnections between field-effect devices are required, they may be deposited on the surface of the oxide layer 39, as will be discussed later.

The advantages of the isolated field-effect devices of the invention for integrated circuitry may be seen from the structure shown FIGS. 9 and 10. The circuit shown in FIG. 11 is that of a high current gain amplifier. Such a circuit uses a field-effect device 50 connected as shown to an NPN transistor 51. Battery 52 and load resistor 53 are connected in series, as shown.

The integrated circuit of FIGS. 9 and 10 is manufactured in the same manner as the device shown in FIGS. 7A–C. The arrangement of the contacts and the characteristics of the regions may be slightly different, because one device is a transistor and the other is a field-effect device. The differences are apparent to one skilled in the art. Interconnections between the field-effect device and the transistor are made by depositing metallic leads over the insulating oxide layer 54, as fully described in U.S. Patent No. 2,981,877, assigned to the same assignee as this invention. Accordingly, lead 55 connects the base electrode of transistor 51 with one of the channel electrodes of field-effect device 50. Lead 56 connects the other channel electrode of field effect device 50 with the collector of transistor 51. Contacts 57 and 58 on the surface of the device are used for connecting the series-connected battery 52 and the load resistor 53 into the circuit. The input electrode 59 is in contact with the gate of field-effect device 50. The signal is transmitted to this input lead.

Substrate and isolating region 60 which completely separate transistor 51 from field-effect device 50, allow any desired interconnection of the two devices. Since all the operating regions of each device are electrically isolated by region 60 from the operating regions of the other, there are no "mandatory" interconnections which need be made because of the inherent geometry of the integrated circuit.

Of course, other transistors, diodes, field-effect devices, resistors, and so on, could also be formed in the same single wafer of semiconductor material. Various arrangements of interconnections may be employed to achieve any desired circuit configuration.

By way of further illustration, but not of further limitation, the following specific example is included of a field-effect device of one embodiment of this invention.

*Example*

A silicon device shown in FIGS. 1 and 2 was made according to the method described above. The thickness of the silicon epitaxial layer 3 was about 7 microns. The upper gate 4 was diffused to a depth of about 4 microns. The lower gate region 2 was diffused down into the wafer 1 a depth of about 2 microns and up into epitaxial layer 3 a similar distance of about 2 microns, giving region 2 a thickness of about 4 microns. The combined diffusions of lower gate 2 and upper gate 4 left about a 1 micron channel region 8 remaining between the gates.

The concentration of impurities (phosphorus) in the channel region was about $6 \times 10^{16}$ atoms/cc. The concentration of impurities (boron) in both of the gate regions at the gate-channel junctions was the same as the concentration of phosphorus in the channel—about $6 \times 10^{16}$ atoms per cc. This concentration increased in both the upper and lower gate regions about tenfold in the direction away from the channel-gate junctions. Thus at the surface of the device, and at the surface of the original wafer 1, the concentration of boron was about $6 \times 10^{17}$ atoms per cc. Where contact is to be made with the channel at regions 9 and 10, the concentration of phosphorus was about $10^{20}$ atoms per cc. The concentration of boron in region 5 was about $10^{19}$ atoms per cc. at the upper surface. The concentration of boron in region 2 was about $5 \times 10^{18}$ atoms per cc. where this region meets the wafer 1 shown in FIG. 1D.

Referring to FIG. 8, the operation of the above device is shown graphically. It had a breakdown voltage of about 18 volts. Pinchoff of channel current was achieved at a gate voltage $V_g$ of about 6 volts. With no gate voltage applied, channel current varied from 0 ma. to about 1 ma. as the source voltage varied from 0 to 18 volts. As shown, the change of channel current with source voltage was modified by application of different voltages to the gate. The device was considered highly satisfactory because of the complete pinchoff obtained at a relatively low gate voltage (6 volts) and because of its high breakdown voltage (18 volts).

From the above description, it will be obvious to one skilled in the art that many modifications and improvements may be made in the devices described herein without departing from the spirit and scope of the invention. Therefore, the only limitations to be placed on that scope are those expressed in the claims which follow.

What is claimed is:

1. A method of making an isolated epitaxial field-effect device which comprises the steps of:
    (a) forming a region of impurities of one conductivity type on a substrate of the opposite conductivity type, said region being surrounded by a periphery of said substrate;
    (b) forming an epitaxial layer of said opposite conductivity type over said region of impurities while said region of impurities diffuses partially into said epitaxial layer to form a first gate region, said epitaxial layer intimately contacting and electrically joining said epitaxial layer to said substrate at said periphery;
    (c) diffusing an extension region of said one conductivity type from the surface of said epitaxial layer into intimate contact with said first gate region, said extension region surrounding a portion of said epitaxial layer and being electrically joined to said region of impurities; and
    (d) diffusing a second gate region of said one conductivity type from the surface of said epitaxial layer into the surrounded portion of said epitaxial layer to a depth above said first gate region, leaving a slice of said epitaxial layer between said first and said second gate regions as a channel.

2. A method of making an isolated epitaxial field-effect device which comprises the steps of:
    (a) forming a region of impurities of one conductivity type on a substrate of the opposite conductivity type, said region being surrounded by a periphery of said substrate;
    (b) forming an epitaxial layer of the opposite conductivity type over said region of impurities while said region of impurities diffuses partially into said epitaxial layer to form a first part of a gate region, said epitaxial layer intimately contacting and electrically joining said epitaxial layer to said substrate at said periphery;
    (c) diffusing an extension region of said one conductivity type from the surface of said epitaxial layer into intimate contact with said first part of said gate region, said extension region surrounding a portion of said epitaxial layer and being electrically joined to said region of impurities; and
    (d) diffusing a second portion of said gate region of said one conductivity type partially into intimate and electrical contact with said extension region, the depth of said diffusion being controlled so that said second part of said gate region is free from contact with said first part of said gate region, thereby leaving a slice of said epitaxial layer as a channel between the two parts of said gate region.

3. A method of making an isolated epitaxial field-effect device which comprises the steps of:
    (a) forming a region of impurities of one conductivity type on a substrate of the opposite conductivity type, said region comprising two parts, an inner part and a surrounding outer part, the impurities of said outer part being of the same one conductivity type as the inner part and being such that they will diffuse farther into an epitaxial layer than those of said inner part under the same diffusion conditions;
    (b) forming an epitaxial layer of said opposite conductivity type over said region of impurities while the inner portion of said region diffuses partially into said epitaxial layer to form a first part of a gate region, and while the outer portion of said region diffuses completely through said epitaxial layer to form an extension of said first part of said gate region, said extension surrounding a portion of said epitaxial layer; and
    (c) diffusing a second portion of said gate region of said one conductivity type partially into intimate and electrical contact with the surrounded portion of said epitaxial layer and partially into said extension region, the depth of said diffusion being controlled so that said second part of said gate region is free from contact with said first part of said gate region, thereby leaving a slice of said epitaxial layer between the two parts of said gate region as a channel.

4. A method of making an isolated epitaxial field-effect device which comprises the steps of:
    (a) forming a region of impurities of one conductivity type on a substrate of the opposite conductivity type, said region comprising two parts, an inner part and a surrounding outer part, the impurities of said outer part being of the same said one conductivity type as the inner part and being such that they will diffuse farther into an epitaxial layer than those of said inner part under the same diffusion conditions;

(b) forming an epitaxial layer of said opposite conductivity type over said region of impurities while the inner portion of said region diffuses partially into said epitaxial layer to form a first gate region, and while the outer portion of said region diffuses completely through said epitaxial layer to form an extension of said first gate region, said extension surrounding a portion of said epitaxial layer; and (c) diffusing a second gate region of said opposite conductivity type from the surface of said epitaxial layer into the surrounded portion of said epitaxial layer to a depth above said first gate region, leaving a slice of said epitaxial layer between said first and said second gate regions as a channel.

References Cited by the Examiner

UNITED STATES PATENTS

| | | | |
|---|---|---|---|
| 3,029,366 | 4/1962 | Lehovec | 317—235 |
| 3,089,794 | 5/1963 | Marinace | 148—1.5 |
| 3,149,395 | 9/1964 | Bray et al. | 317—234 X |
| 3,183,128 | 5/1965 | Leistiko | 317—235 |
| 3,197,710 | 7/1965 | Lin | 317—235 |

FOREIGN PATENTS 629,213   10/1961   Canada.

OTHER REFERENCES

I.B.M. Technical Disclosure Bulletin, vol. 4, No. 10, March 1962, pp. 58 and 59.

JOHN W. HUCKERT, *Primary Examiner.*

J. D. KALLAM, L. ZALMAN, A. M. LESNIAK, *Assistant Examiners.*